United States Patent

[11] 3,631,472

[72] Inventor Andrew J. Lincoln
Concord, Mass.
[21] Appl. No. 125
[22] Filed Jan. 2, 1970
[45] Patented Dec. 28, 1971
[73] Assignee Sperry Rand Corporation

[54] CAPACITIVE KEYING MODULE AND SYSTEM
15 Claims, 10 Drawing Figs.

[52] U.S. Cl. .......... 340/365, 235/145 R, 307/119, 331/74
[51] Int. Cl. .......... G08c 1/00, H03k 17/80
[50] Field of Search .......... 340/365, 337, 345; 178/81, 101, 17; 235/145; 197/98, 101; 317/249, 251; 200/159 R; 331/74; 307/119

[56] References Cited
UNITED STATES PATENTS

| | | | |
|---|---|---|---|
| 3,257,658 | 6/1966 | Lloyd .......... | 340/324 |
| 3,293,640 | 12/1966 | Chalfin et al. .......... | 340/365 |

OTHER REFERENCES
IBM Technical Disclosure, " Nonmechanical Keyboard," Vol. 3, No. 11, Apr. 1961.

*Primary Examiner*—Robert L. Griffin
*Assistant Examiner*—John C. Martin
*Attorney*—S. C. Yeaton

ABSTRACT: A modular key for an electrical keyboard employs a capacitive voltage divider circuit with stator and armature capacitive elements forming a pair of capacitors in ganged relation. Downward motion of one capacitor element when a key is manually depressed produces a corresponding change in the output of the divider sufficient to overcome the threshold of a transistor detector circuit. An inverted output data pulse is supplied, free of disturbing transients, at the input of associated digital processing equipment.

INVENTOR
ANDREW J. LINCOLN
BY
HP Terry
ATTORNEY

INVENTOR.
ANDREW J LINCOLN
BY
HP Terry
ATTORNEY

INVENTOR.
ANDREW J. LINCOLN
BY
H P Terry
ATTORNEY

INVENTOR
ANDREW J. LINCOLN
BY
HP Terry
ATTORNEY

CAPACITIVE KEYING MODULE AND SYSTEM

BACKGROUND OF THE INVENTION

1. Field of the Invention

The invention relates to manually operable electric keys suited for application in keyboards employed, for example, in peripheral equipment associated with digital data processors. More particularly, the invention concerns modular key elements employing capacitive means including a manually movable capacitive armature as a portion of adjustable capacity voltage divider.

2. Description of the Prior Art

Many prior art keyboard systems employ electrical contacts, directly made and broken by the manual depression and release respectively of corresponding manual keys, for generating electrical data signals for use in automatic data-processing machines. In such keyboards, the depression of a key functions to cause a direct mechanical linkage to close a pair of electrical contacts individual to a selected data character. In response thereto, an encoder may insert signals corresponding to the data character into a register or other data processor element.

In some switch-actuating keyboard systems, encapsulated reed switches have been employed. The reed switch contact pairs are caused to close a circuit when a key is compressed by causing a small bar magnet to be moved alongside of the switch capsule. The contacts close by virtue of the positioning of the magnet such that the magnetic flux path of the magnet flows through the reeds of the switch, pulling its contacts together. In the normal or unoperated position of the key, the magnet is in such a position that its flux path cannot be completed through the reeds of the encapsulated switch, and the switch contacts are therefore open.

It is characteristic of these and other keyboard systems that initial and maintenance costs are relatively high, since the mechanical parts used, including the electrical contacts themselves, must be precisely made and fitted and must remain so. The reliability of such key switches is not great because of the many moving parts employed and because electrical contacts tend to degrade in time. When the contacts deteriorate, high amplitude transient voltages may be generated which further shorten switch life. The transients are also a source of errors in that they may couple into nonselected data channels of a digital processor and cause it to operate incorrectly. While error correcting circuits may cause the processor to disregard such erroneous signals, they do not always succeed in this mission, and add to the complexity and cost of the apparatus. Likewise, antibounce circuits sometimes added to equipment for alleviating the bad effects of contact bounce are an added expense.

A further disadvantage of keys which make and break electrical contacts lies in the inherent nature of their function. Evidently, such contacts operate at a particular depression of the key, and therefore, operation of the keyboards employing them requires an operator to cause each key operated to be depressed to an equal degree. In the absence of such operation, certain keys may not be moved far enough, and the corresponding electrical contacts are not operated, causing errors.

SUMMARY OF THE INVENTION

The invention is a modular keying device for use in keyboard arrays of the type used in data-processing equipment. A source of a train of voltage pulses applies its output across ganged-capacitor voltage divider elements of individual key modules. Operation of a manually depressable key associated with each module alters the division ratio of the corresponding capacitor voltage divider. When a key is depressed, the output level of the associated divider circuit increases and is raised above the threshold level of a selected field effect transistor arranged in common source amplifier configuration to provide an output, only when the key is depressed, to a utilization circuit. The modular key itself takes several forms, each characterized by having capacitive stator plates affixed to the interior of the module walls in the general manner of a printed circuit and having a capacitive armature plate moved when an associated key is depressed. The various elements of each capacitive network are arranged so that a useful output is produced over a range of degrees of depression of the key, precise motion of each key exactly to a predetermined position being no longer necessary. The individual key modules are adapted to insertion in a variety of combinations in an array held in a frame cooperating with spring holder means.

DESCRIPTION OF THE PREFERRED EMBODIMENTS

Figure 1:
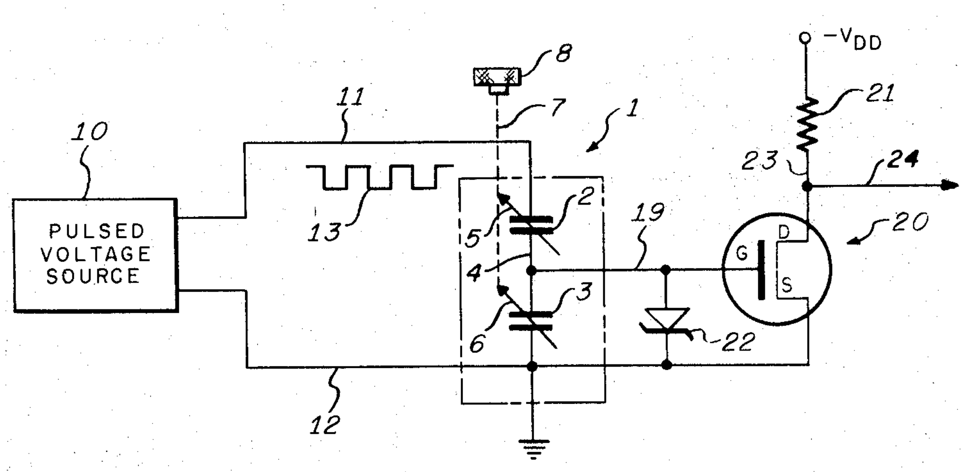
FIG. 1 is a circuit diagram showing the basic voltage divider principle of the invention.

FIG. 1 illustrates the basic principles of the novel key switch device adapted for employment in modular form in keyboards suitable for use, for instance, in digital and other data processing systems. In FIG. 1, the numeral 1 generally represents a key switch device comprising a first variable capacitor 2 and a second variable capacitor 3 connected in series by a conductor 4. The arrows 5 and 6, respectively associated with capacitor 2 and 3, represent movable elements of the capacitors; the dotted line 7 indicates the ganged relation of the movable elements of capacitors 2 and 3 while knob 8 represents any convenient manual element for operating those movable elements. It is seen that capacitors 2 and 3 represent two capacitors in a capacitive voltage divider network including elements 2, 3 and 4. As will also be seen, the movable elements of variable capacitors 2 and 3 are operated so that they are normally placed in one extreme position or are placed in a second extreme position at the will of a keyboard operator.

Because the principle of operation of the invention is based on the variation of the values of the two capacitors 2 and 3 in a capacitive voltage divider circuit, a suitable voltage is applied by conductor 11 and the grounded conductor 12 across the voltage divider circuit including elements 2, 3, 4 of a key switch 1. For this purpose, a pulse chain such as waveform 13 having a voltage level $V_{in}$ may be supplied by a conventional voltage source 10.

An output voltage $V_{out}$ may be derived at the conductor 4 joining capacitors 2 and 3 and appears on conductive lead 19. Examination of the voltage divider circuit including elements 2, 3, 4 shows that the voltage $V_{out}$ may be expressed by:

$$V_{out}=V_{in}C_2/(C_2+C_3) \qquad (1)$$

where $C_2$ is the capacitance of capacitor 2 and $C_3$ is that of capacitor 3. Or:

$$V_{out}=V_{in}/(1+C_3/C_2) \qquad (2)$$

It is seen from equation 2 that the output voltage $V_{out}$ of the divider (appearing on conductor 19 when a pulse of wave chain 13 is present) is a function only of a ratio of capacitances $C_2$ and $C_3$. The ganged relation of capacitors 2 and 3 is of such a nature that downward movement of the movable elements of the capacitors causes the value of $C_3$ to be decreased and the value of $C_2$ to be increased. Thus, such downward motion will cause a corresponding increase in the amplitude of the voltage $V_{out}$.

The output voltage $V_{out}$ is supplied by conductor 19 to a suitable level detection circuit. This circuit may take the form of a common source transistor amplifier arranged in a conventional way to give greater than unity gain. For example, a conventional n-channel MOSFET field effect transistor device 20 may be so employed. There are available several types of high-input resistance transistors suitable for use as transistor 20. For example, a transistor of the enhancement mode field effect type may be used.

As is seen in the right-hand portion of FIG. 1, the output conductor 19 is attached to the gate G of transistor 20, while its source electrode S is coupled to ground. On the other hand, the drain electrode D is coupled via conductor 23 and resistor 21 to a source of unidirectional voltage $-V_{DD}$, as is the usual practice. The final voltage output of the transistor circuit is derived on a conductor 24 which is coupled to conductor 23 between transistor 20 and resistor 21.

While the presence of a high-input resistance in transistor 20 is desirable for use in the present invention, conventional types of field effect transistors may be destroyed if transient voltages from associated circuits are coupled in one way or another to the input of transistor 20. For example, electrostatic charges discharged in the normal operation of associated equipment or simply by plugging the equipment into its power source when turning the equipment on can destroy transistor 20.

To protect transistor 20 from damage due to transients, a diode such as Zener diode 22 is coupled between conductor 19 and the grounded conductor 12. Diode 22 is arranged to isolate the gate G of transistor 20 from any relatively high-amplitude stray charge transients that may inadvertently be picked up, rather than the normal charging that takes place during manual key operation. Zener diode 22 is selected to have a particular breakdown characteristic such that relatively high-amplitude transients cause diode 22 momentarily to break down. The energy of such transients is immediately shorted to ground through diode 22 without damage to transistor 20.

Summarizing the operation of the invention as thus far described, pulse train 13 is continuously applied from pulsed voltage source 10 across capacitor network including elements 2, 3, 4. With the movable elements of capacitors 2 and 3 in their normal or nonoperated position, the network including elements 2, 3, 4 supplies a version of pulse train 13 via conductor 19 too small with respect to the threshold of transistor 20 for it to generate an inverted pulse chain output on conductor 24. Should a transient voltage of predetermined amplitude be coupled to conductor 19, it is harmlessly shunted to ground via diode 22.

When the movable elements of capacitors 2 and 3 are moved downward to the keyed or operated position, the network including elements 2, 3, 4 now has a new capacity ratio such that a pulse chain corresponding to pulse chain 13 is now directed to the gate G of transistor 20. The amplitude of the pulse chain then appearing on conductor 19 is greater than the threshold of transistor 20. Accordingly, transistor 20 passes and amplifies these input pulses and they appear on conductor 24 as a useful output. They are employed in the conventional manner in data-processing equipment after passing through suitable conventional interface elements (not shown). Again, should a momentary transient voltage of predetermined amplitude be undesirably coupled to conductor 19, it is at once shunted to ground by Zener diode 22. Since the individual pulses of pulse chain 13 are chosen to be long relative to the usual duration of each transient voltage, the energy in any useful output pulse appearing on conductor 24 while a transient occurs is diminished only slightly. Thus, the operation of associated equipment receiving data pulses from conductor 24 is not degraded.

Figure 2:
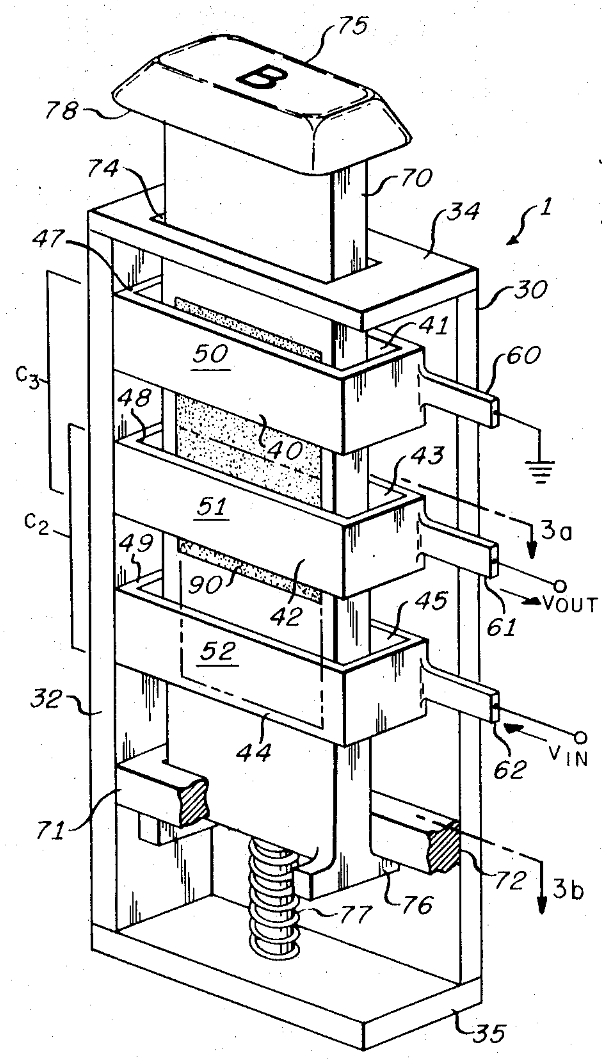
FIG. 2 is a perspective view of one form of the key module with certain parts removed to expose to view the interior of the key module.
Figure 3A:
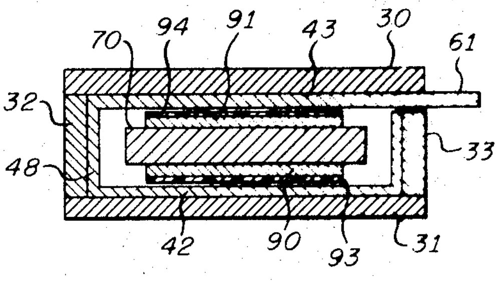
FIGS. 3*a* and 3*b* are cross section views of FIG. 2 taken at section lines 3*a* and 3*b*, respectively, of FIG. 2.
Figure 3B:
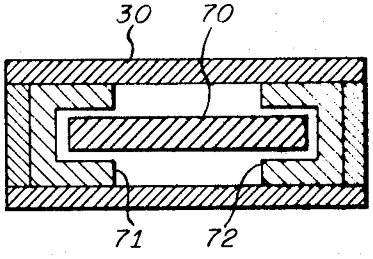

One suitable form of the key switch device 1 of FIG. 1 is illustrated in FIGS. 2, 3*a*, and 3*b*. These figures show an embodiment having a casing comprising four flat walls 30, 31, 32, 33, arranged to form a rectangular enclosure which is, in turn, closed by end walls 34 and 35. Walls 31 and 33 are not seen in FIG. 2 for the sake of permitting a clear presentation of parts of the key switch device 1 enclosed by the six walls. It will be apparent, however, that wall 31 is similar in shape and function to wall 30, while wall 33 is similar in shape and function to wall 32.

Walls 30, 31, and 32 are adapted to act as insulating substrates for capacitor plates and may be of the type commonly used in the manufacture of printed circuits. For example, the interior surface of wall 30 is provided with capacitor plates 41, 43 and 45 of substantially equal dimensions and substantially equally spaced apart. Wall 31 (not seen in FIG. 2) has corresponding capacitor plates 40, 42, and 44 on its interior surface. FIG. 2 shows capacitor plates 40, 42, and 44 simply hanging in space as if wall 31 had simply been stripped from them.

The intermediate wall 32 has corresponding regularly spaced apart conductive plates 47, 48, and 49. It is observed that conductive plates 40, 41, and 47 comprise a continuous conductive band 50. Likewise, plates 42, 43, and 48 form a second continuous conductive band 51 spaced below band 50. Again, plates 44, 45, and 49 form a continuous conductive band 52 spaced below band 51. Each band may be completed by a fourth segment, if desired, so that each represents a rectangular closed loop. Band 50 is provided with a tab or electrical terminal 60 which projects through wall 33 (see FIG. 3*a*) for external accessibility. Likewise, band 51 has a similar tab 61 and band 51 a similar tab 62. In some applications, it may be preferred that tabs 60, 61, and 62 be extended by standard printed circuit technology so that conductive leads to bands 50, 51, and 52 are brought out through the bottom wall 35 of the key switch module.

The bands 50, 51, and 52 serve as the stator plates of the capacitors 2 and 3 of FIG. 1. The movable capacitor means of FIG. 1 is shown in FIGS. 2, 3*a*, and 3*b* as comprising elements associated with dielectric armature number 70. Armature 70 is arranged to translate freely up or down within the confines of the walls of the module, but may be restrained from substantial lateral movement in part by guides such as shown at 71 and 72 in FIGS. 2 and 3*b*.

Armature 70 projects through a rectangular slot 74 in upper wall 34 and is capped by a suitable finger key 75. In its normal position, armature 70 is forced to a predetermined upper limiting position, substantially as shown in FIG. 2, by spring 77, spring 77 urging stop 76 against guide 72, for instance. When key 75 is manually depressed, armature 70 moves downward, compressing spring 77. A second suitable stop may be used to determine the extreme depressed position of armature 70. Alternatively, spring 77 may, when completely collapsed, inherently serve as a stop, or the bottom surface 78 of key 75 may serve this purpose when it contacts the upper surface of wall 34.

Armature 70 is seen to be provided with rectangular conductive capacitive plates 90 and 91 mounted back-to-back on its opposed flat walls. The plates 90 and 91 operate at a common floating potential, being conductively connected by bridging connection such as seen at 92. The sizes of plates 90 and 91 are the same and are predetermined by the sizes selected for bands 50, 51, and 52 and by their spacing. In other words, it is seen that the rectangular plate 90 on armature 70, when key 75 is in its nondepressed condition, fully occupies the region underlying bands 50 and 51 and spans the gap between them. When key 75 is in its depressed condition, plate 90 fully occupies the region underlying bands 51 and 52 and spans the gap between them.

In order to make the values of parameters $C_2$ and $C_3$ large, bands 50, 51, and 52 are made to lie as close to the armature 70 as possible and consequently are separated from armature plates 90 and 91 by only a small distance. The capacity of the gap thus formed may be further adjusted by coating the armature plates 90 and 91 with a thin layer of dielectric film which serves to provide increased capacitance and to aid in regulating the gap thickness. In addition, if a lubricating type of dielectric film, such as a polymerized fluorocarbon resin material is employed, the film, as shown at 93 and 94 in FIG. 3a, aids in restraining unwanted motion of armature 70.

As is shown in FIG. 2, band 50 is coupled via tab 60 to ground and band 52 is supplied via tab 62 with the input pulse chain 13 of voltage $V_{in}$. The key switch output is taken from the middle band 51 via tab 61.

Operation of the device has been explained in connection with FIG. 1, but it is clear that when armature 70 is driven by keying action to its depressed condition, maximum capacitive coupling exists between the lower band 52, the central band 51, and armature plates 90 and 91. Conversely, when spring 77 returns the armature 70 to its uppermost position, maximum capacitive coupling obtains between the upper band 50, the central band 51, and the armature plates 90 and 91.

Figure 4:
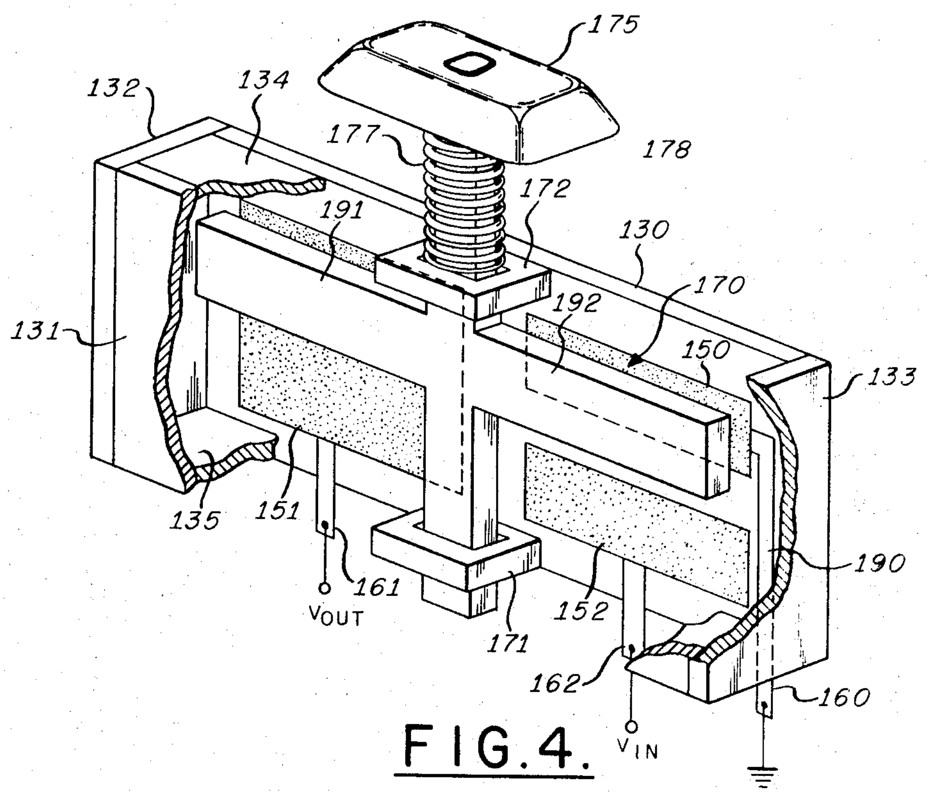
FIG. 4 is a perspective view similar to FIG. 2 of an alternative form of the invention.

The configuration of FIG. 2 may be altered somewhat as in FIG. 4 to provide a configuration which may be useful in types of keyboards when the rows of keys are again staggered, but where it is desired that the keyboard have minimum height. In FIG. 4, many elements are counterparts of elements used in FIG. 2. Similar parts in FIG. 4 therefore bear similar reference numerals to which a factor of 100 has been added.

For example, the device of FIG. 4 has sidewalls 130, 131, 132, and 133 and upper and lower walls 134 and 135 forming a modular casing for the key switch device. Again, a fragmentary view is shown for the purpose of permitting a clear presentation of the interior parts of the embodiment. It will again be apparent that the device is provided with a wall 131, similar in shape and in function to wall 133.

Walls 130 and 131 are adapted to act as dielectric substrates for mounting capacitor plates. For example, the interior surface of wall 130 is provided on its right-hand half with a pair of equal sized capacitor plates 150 and 152, one positioned above the other. The opposite wall 131 has corresponding opposed pairs of equally dimensioned capacitor plates (not shown). The left half of the interior surface of wall 130 serves to mount a single capacitor plate 151 having substantially the same width as plates 150 and 152, and occupying an area equal to the area occupied by plates 150 and 152, plus the area between them. The opposite wall 131 has a corresponding plate (not shown) of equal dimensions.

Capacity plate 150 and its companion on wall 131 are connected to ground, as by tab 160 projecting through the bottom wall 135 of the module. Likewise, capacity plate 152 and its companion on wall 131 are supplied with a pulse chain 13, as by tab 162, shown as receiving the voltage $V_{in}$. Similarly, the large capacity plate 151 and its companion opposite it on wall 131 may be supplied with a tab 161, from which one draws the output voltage $V_{out}$ for application to transistor 20 of FIG. 1.

The plates 150, 151, and 152 serve as the stator plates of the key switch module. The movable capacitive means of FIG. 4 is shown as comprising elements associated with the cruciform metallic armature member 170 which may conveniently be made of aluminum or copper. Armature 170 is arranged to translate up or down freely through apertures in guides 171, 172 (these guides may actually be formed by apertures in upper and lower walls 134 and 135, respectively). Guide 172 (or wall 134) supports a spring 177 wound around the portion of armature 170 supporting key 175.

In its normal or nondepressed position, armature 170 is forced to an upper limiting position as shown in FIG. 4 by spring 177. When key 175 is manually depressed, armature 170 moves downward and spring 177 is compressed.

Armature 170 is seen to be provided by colinearly extensive arms 191 and 192 which operate at a common floating potential. Arm 191 of armature 170 is always capacitively coupled to plate 151 and to its counterpart, if present. In the nondepressed state of armature 170, arm 192 lies over capacity plate 150 while, when armature 170 is depressed, arm 192 lies over the lower capacity plate 152. The gap between armature 170 and the capacitive plates 150, 151, and 152 on wall 130 may be precisely determined by coating either the armature 170 or the capacity plates with a thin uniform dielectric film, as was explained in connection with the embodiment of FIG. 2.

Operation of the device is clear from the foregoing discussion of FIGS. 1 and 2, but it is seen that when armature 170 is driven by keying action to its depressed position, maximum capacity coupling obtains between lower plate 152 and the left-hand plate 151. Conversely, when spring 177 returns armature 170 to its upper position, the maximum capacitive coupling is between the upper plate 150 and the left-hand plate 151.

Inherent in the inventive devices above described is the absence of electrical contacts and of problems associated with them, including the generation of interfering electrical transients, contact bounce, and the like, and the presence of enhanced reliability and long life potential because of the use of few moving parts. The modular configuration of the key switch of the present invention, as will also be seen from the discussion which follows of FIGS. 5 to 8, is of a type offering low cost and the good reliability needed in modern data processing and digital computer and communication systems. It will be seen that the modular approach of the present invention offers flexibility of design, permitting a choice of options according to the needs of the industry.

Figure 5:
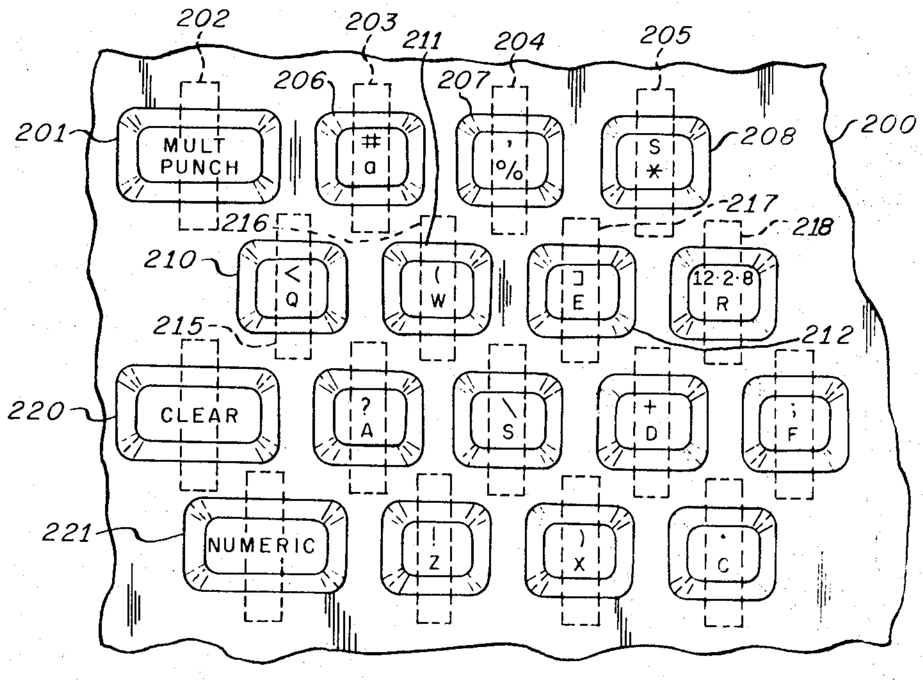
FIG. 5 is a simplified fragmentary view of a keyboard illustrating the placement of key modules therein.

For example, reference to FIG. 5 illustrates one way in which the relatively flat modules of FIG. 2 or 4 may be arrayed beneath the top 200 of a standard keyboard having a plurality of keys such as key 201. The dotted line 202 represents the area below top 200 of the key module associated with key 201. Each module 203, 204 and 205, for instance, is associated with a respective module 206, 207, 208. Keys 210, 211, 212, 213 are in a row staggered with respect to the keys of the above-described row and are respectively associated with key modules 215, 216, 217, 218. Row 220 is similarly staggered with respect to the row-containing key 210. Row 221 is similarly staggered with respect to row 220. The keys of rows 220 and 221 are supplied with respective key modules placed as indicated by dotted rectangles.

Figure 6:
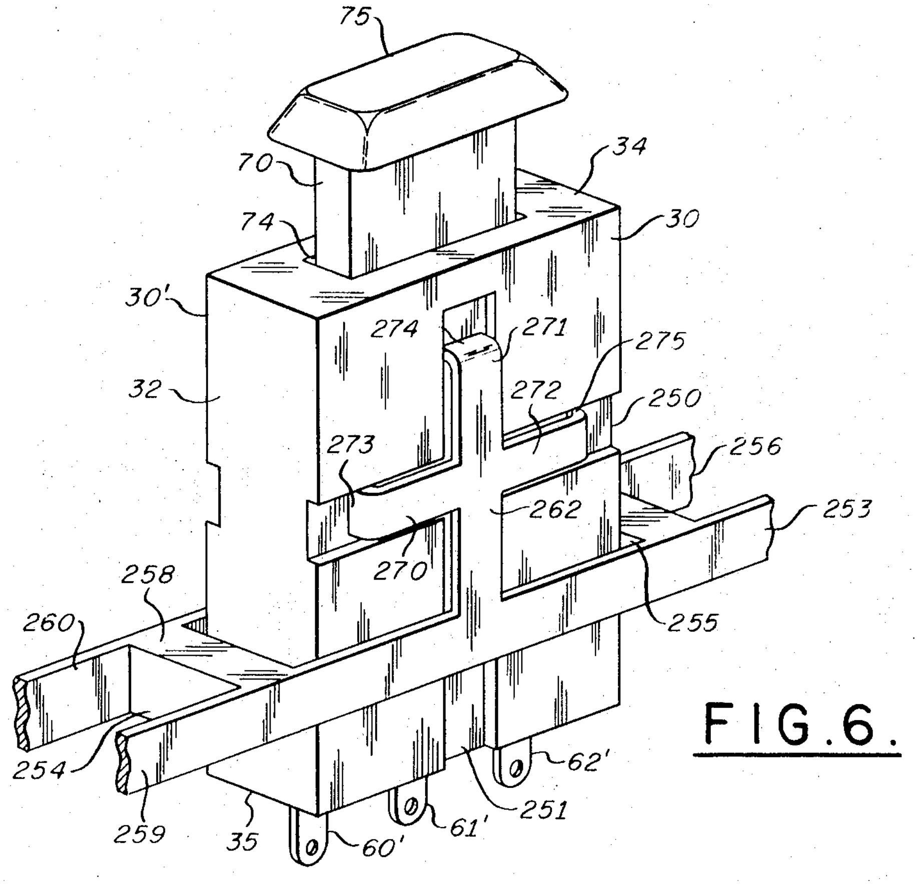
FIG. 6 is a partial perspective view of a frame and mounting arrangement for holding an array of the modules of FIG. 2.
Figure 9:
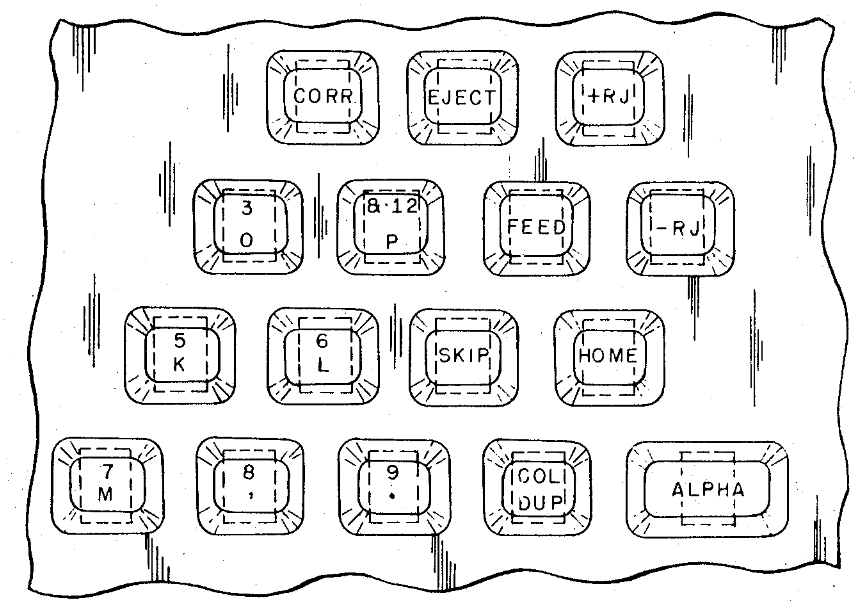
FIG. 9 is a simplified fragmentary view of a keyboard illustrating the placement of key modules therein.

As is seen, the configuration shown in FIG. 5 permits the easy formation of an array of keys with optimum or acceptable spacings upon a keyboard. Further, the key modules are adaptable to use in frames with holding elements such as shown in FIG. 6. The key module illustrated in FIG. 6 is that of FIG. 2; accordingly, the corresponding parts have corresponding reference numerals, including walls 30, 32, 34 and 35, slot 74, key 75 and armature 70.

In FIG. 6, certain walls of the key module are slightly modified. For example, wall 30 and its opposed corresponding wall 30' are each provided with a horizontal slot 250 and a vertical slot 251 arranged in the form of a cross. The actual depth of the slot may be smaller than it has been chosen in FIG. 6 for convenience of illustration.

The key module is provided with slots 250, 251 for cooperation with a keyboard frame for mounting columns or rows of the key modules. The frame may comprise a plurality of parallel aligned frame elements such as the U-shaped channel member 253; member 253 has a series of rectangular slot apertures 254, 255, and 256 cut in its upper surface 258. A key module may be inserted through any combinations of these slots, as illustrated in the figure by the key module inserted in slot 255. The U-shaped member is strengthened by the downwardly extending arms 259, 260.

Extending vertically from arms 259 and 260 are cruciform spring mounting elements, such as element 262 extending from arm 259 above the plane of apertured surface 258. The mounting element includes, for instance, arms 270, 271, and 272 made of a flexible lead spring material. The arms 270, 271, and 272 are respectively provided with curved contacts or fingers 273, 274, and 275 which drop into channels 250 and 251 when the key module is inserted in the keyboard frame. Since each side of the key module employs such a spring mount system, the key module, when once inserted in the keyboard frame, is held positively in a precise position until removal. Instead of the particular crossed slots 250, 251 shown in the figure, other indentation arrangements may evidently be employed, such as combinations of relatively short V-shaped grooves and cone-shaped depressions, as are ordinarily used to fix the location of parts relative to each other without over constraint.

Figure 7:
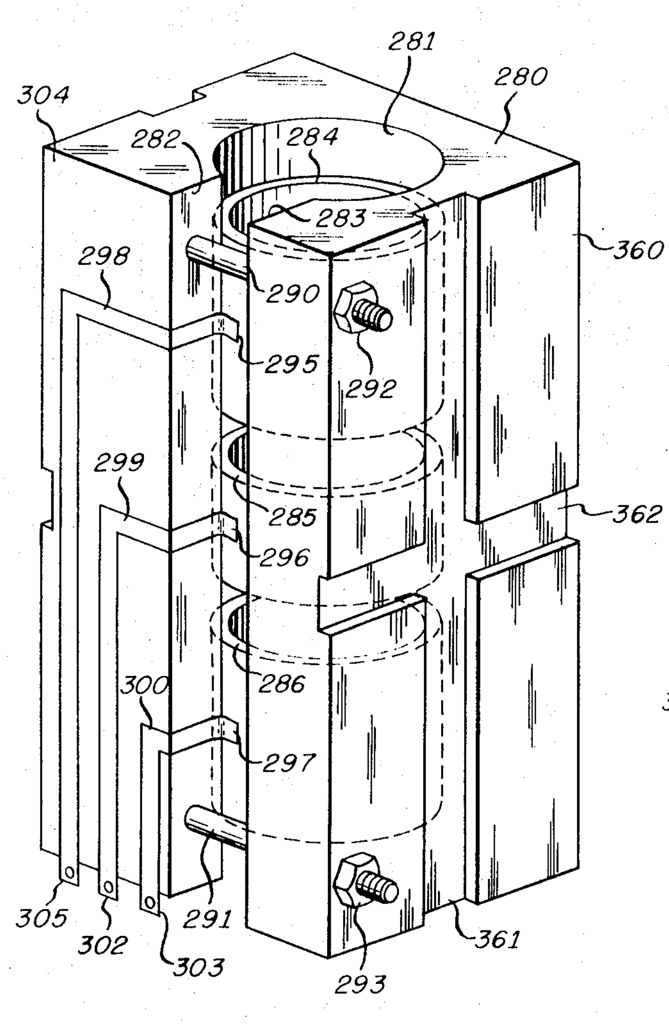
FIG. 7 is a fragmentary perspective view, partly in cross section, of the stator of a further alternative form of the invention.
Figure 8:
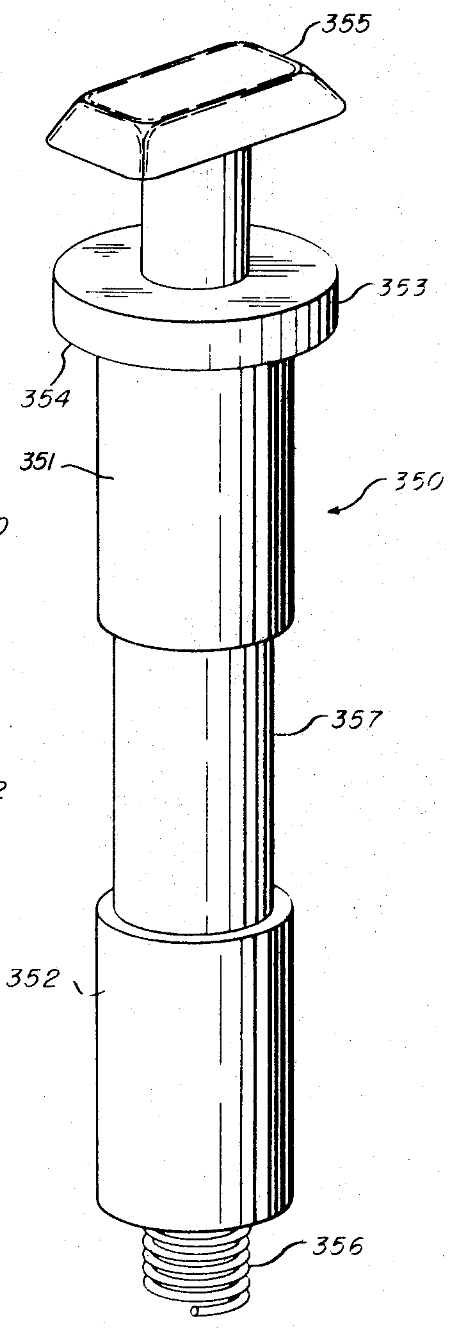
FIG. 8 is a perspective view of a part which operates as a movable armature in cooperation with the stator of FIG. 7.

The novel key module according to the present invention may take forms in addition to those of FIGS. 2 and 4, as will be seen from FIGS. 7 and 8; in those figures, it has been elected to illustrate the primary features of the stator element of the capacity divider module in FIG. 7, whereas the armature element is shown in FIG. 8. It will be apparent how the elements of FIGS. 7 and 8 cooperate from the preceding discussion of FIGS. 1 to 6 and from the following discussion.

The key modules of the preceding discussion are relatively flat modules; FIGS. 7 and 8 illustrate a module for use when the desired format of the keyboard is more readily achieved with modules of substantially square configuration. Referring to FIG. 7, the stator portion of the module depends from a casing formed of a substantially square block 280 of electrically insulated material of relatively good dielectric characteristics. Block 280 is supplied with a hole 281 drilled or formed longitudinally through block 280. A slot with an axis parallel to the axis of hole 281 is formed by the casting process when block 280 is manufactured or is cut therein, subsequently. The slot is defined by facing parallel walls 282 and 283.

It will be seen that the key module of FIGS. 7 and 8 is similar to that of FIG. 2 in a large sense, in that it is generated by using capacitor plates of circular cross section rather than of generally rectangular shape. For instance, the bore 281 of the module of FIG. 7 has three fixed capacitor plates, numbers 284, 285, and 286. These are respectively analogous to capacitive plates 50, 51, and 52 of FIG. 2. Ring plates 284, 285, and 286 are made of thin, electrically conductive tubing and are pressed into bore 281 and positioned with desired separations, as illustrated. They may be fixed in space by tightening nuts 292 and 293 on threaded rods 290 and 291, both of which rods pass through block 280 and particularly through the slot defined by the opposed wall faces 282 and 283.

When so mounted, ring capacitive plates 284, 285, and 286 are respectively coupled at junctions 295, 296, and 297 to printed circuit conductors 298, 299, and 300 lying on the face of a wall 304 of the modular block 280. Conductors 298, 299, and 300 may be coupled to suitable output terminals, such as terminals 301, 302, and 303, or such as standard plug terminals.

In FIG. 8, there is illustrated an armature element 350 corresponding to the movable dielectric armature element 70 of FIG. 2; armature element 350 is composed of a dielectric body whose surface is actually seen on an upper cylindrical section 351 and on a similar lower section 352. Sections 351 and 352 make an easy sliding fit within the bore 281 of block 280 shown in FIG. 7 and, in fact, are actually translatable within ring capacitor plates 284, 285, and 286, the inner diameters of rings 284, 285, and 286 substantially matching the outer diameter of section 351 and 352 of the armature 350 of FIG. 8. Above section 351 is disk 353 of diameter greater than section 351 arranged to act as a motion stop, the lower surface 354 of disk 353 being adapted to impact the upper surface of block 280 of FIG. 7 when the key 355 of FIG. 8 is depressed. Suitable spring means 356 are employed to return the key armature 350 to its rest position after depression.

The operation of the structure of FIGS. 7 and 8 will be understood again to involve fixed capacitive ring elements 284, 285, and 286 which operate as described, for example, in connection with FIGS. 1 and 2, to form ganged variable capacitor elements in cooperation with a conductive ring 357 surrounding the midpoint of armature 350. Conductive ring 357 has an outer diameter slightly less than that of sections 351, 352; thus, ring 357 is only capacity coupled to the stator members 284, 285, and 286 and never actually contacts them. As before, it will be understood that armature ring 357, when armature 350 is in its rest position, acts primarily to couple stator rings 284 and 285 capacitively. When armature 350 is in its depressed position, ring 357 acts primarily to furnish capacitive coupling between stator rings 285 and 286.

Returning to FIG. 7, it is seen that one pair of sides such as side 360 of the key module is equipped by cross-defining slots 361 and 362, so that the key module of FIG. 7 is adapted to use with a spring mounting array such as illustrated in FIG. 6.

While the invention has been described in its preferred embodiments, it is to be understood that the words which have been used are words of description rather than limitation and that changes within the purview of the appended claims may be made without departure from the true scope and spirit of the invention in its broader aspects.

I claim:

1. In a manually operable modular keying means:

first means having a first capacitive surface, second means having at least second and third spaced capacitive surfaces cooperative with said first capacitive surface, said second capacitive surface being adapted for coupling to pulse train signal generator means, said third capacitive surface being adapted for coupling to pulse signal utilization means, manually operable means providing relative motion between said first and second means from a first positional relation to a second positional relation whereby said capacitive surface of said first means capacitively couples said second and third spaced capacitive surfaces in said first positional relation and provides substantially no such capacitive coupling in said second positional relation, and means for returning said first and second means to said first positional relation.

2. Apparatus as described in claim 1 wherein said second means is provided with at least one insulator surface with second, third and fourth spaced capacitive surfaces affixed to said insulator surface.

3. Apparatus as described in claim 2 wherein said capacitive surface of said first means capacitively couples said second and third spaced capacitive surfaces in said first positional relation and capacitively couples said third and fourth spaced capacitive surfaces in said second positional relation.

4. Apparatus as described in claim 1 wherein said first means consists of an electrically conductive metal.

5. Apparatus as described in claim 1 wherein said first means is substantially cruciform.

6. Apparatus as described in claim 1 wherein said first means is formed of a dielectric material with at least one surface of said material being provided with an electrically capacitive surface.

7. Apparatus as described in claim 1 wherein said capacitive surface of said first means is electrically insulated so that its electrical potential is self-adjusting.

8. Apparatus as described in claim 1 wherein said second means has a surface composed of an electrical insulator.

9. Apparatus as described in claim 2 wherein said second, third, and fourth spaced capacitive surfaces are provided with first, second, and third electrical terminals providing means for connection to circuit means external of said second means.

10. Apparatus as described in claim 9 wherein said first terminal is connected to ground, said second terminal is connected to supply voltage of level $V_{OUT}$ to utilization apparatus, and said third terminal is connected to a generator of electrical pulses of voltage level $V_{IN}$.

11. Apparatus as described in claim 2 wherein a thin film of solid dielectric material lies between said capacitive surface of said first means and said second, third, and fourth spaced capacitive surfaces.

12. Apparatus as described in claim 10 wherein voltage level $V_{OUT}$ is increased when said first means and said second means are changed to said first positional relation.

13. Apparatus as described in claim 10 wherein said utilization apparatus includes an amplifier with a threshold potential lying between values of $V_{OUT}$ characteristic of said respective first and second positional relations of said first and second means.

14. Apparatus as described in claim 13 wherein the input supplying voltage $V_{OUT}$ to said amplifier includes a path from said input to ground for undesired transient signals for the purpose of protecting said amplifier.

15. Apparatus as described in claim 1 wherein said second means includes at least one external surface having depressions adapted to cooperate with keyboard mounted spring means for holding said modular keying means within an array of said modular keying means.

* * * * *